United States Patent
Ho et al.

(10) Patent No.: US 9,236,945 B2
(45) Date of Patent: Jan. 12, 2016

(54) THERMALLY SHIELDED MULTI-CHANNEL TRANSMITTER OPTICAL SUBASSEMBLY AND OPTICAL TRANSCEIVER MODULE INCLUDING SAME

(71) Applicant: Applied Optoelectronics, Inc., Sugar Land, TX (US)

(72) Inventors: I-Lung Ho, Sugar Land, TX (US); Jun Zheng, Missouri City, TX (US); Luohan Peng, Cypress, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 185 days.

(21) Appl. No.: 13/760,533

(22) Filed: Feb. 6, 2013

(65) Prior Publication Data
US 2014/0161459 A1  Jun. 12, 2014

Related U.S. Application Data

(63) Continuation-in-part of application No. 13/708,569, filed on Dec. 7, 2012.

(51) Int. Cl.
*G02B 6/36* (2006.01)
*H04B 10/40* (2013.01)
(Continued)

(52) U.S. Cl.
CPC .............. *H04B 10/40* (2013.01); *H04B 10/506* (2013.01); *H04J 14/025* (2013.01); *H04J 14/0246* (2013.01)

(58) Field of Classification Search
CPC .... H04B 10/504; H04B 10/50; H04B 10/503; H04B 10/506; H04B 10/38; G02B 6/4246; G02B 6/42; G02B 6/4273; G02B 6/2938; G02B 6/4269; G02B 6/4271
USPC ............ 385/31, 37, 88–92; 398/70, 139, 141, 398/158, 79, 82, 67, 68, 71, 72
See application file for complete search history.

(56) References Cited

U.S. PATENT DOCUMENTS

| | | | |
|---|---|---|---|
| 4,786,132 A | 11/1988 | Gordon | |
| 5,042,898 A | 8/1991 | Morey et al. | |

(Continued)

FOREIGN PATENT DOCUMENTS

| | | |
|---|---|---|
| JP | 2000174397 A | 6/2000 |
| KR | 20000049869 A | 8/2000 |

(Continued)

OTHER PUBLICATIONS

PCT International Search Report and Written Opinion dated Oct. 22, 2012 received in corresponding PCT Application No. PCT/US2012/046912, 8 pgs.

(Continued)

*Primary Examiner* — Ryan Lepisto
*Assistant Examiner* — Mary El Shammaa
(74) *Attorney, Agent, or Firm* — Grossman Tucker Perreault & Pfleger, PLLC; Norman S. Kinsella

(57) ABSTRACT

A thermally shielded multi-channel transmitter optical subassembly (TOSA) may be used in a multi-channel optical transceiver. The multi-channel TOSA generally includes an array of lasers optically coupled to an arrayed waveguide grating (AWG) to combine multiple optical signals at different channel wavelengths. A plurality of laser array thermal shields are thermally coupled to a temperature control device, such as a thermoelectric cooler (TEC), and thermally shield the respective lasers in the laser array in separate thermally shielded compartments. Each of the lasers may also be individually thermally controlled to provide a desired wavelength, for example, using a heater and/or cooler located in each thermally shielded compartment. The optical transceiver may be used in a wavelength division multiplexed (WDM) optical system, for example, in an optical line terminal (OLT) in a WDM passive optical network (PON).

20 Claims, 8 Drawing Sheets

(51) Int. Cl.
*H04B 10/50* (2013.01)
*H04J 14/02* (2006.01)

(56) References Cited

U.S. PATENT DOCUMENTS

| | | | |
|---|---|---|---|
| 5,499,256 | A | 3/1996 | Bischel et al. |
| 5,729,563 | A | 3/1998 | Wang et al. |
| 5,732,102 | A | 3/1998 | Bouadma |
| 5,757,828 | A | 5/1998 | Ouchi |
| 5,937,120 | A | 8/1999 | Higashi |
| 5,987,200 | A | 11/1999 | Fleming et al. |
| 6,111,999 | A | 8/2000 | Espindola et al. |
| 6,118,562 | A | 9/2000 | Lee et al. |
| 6,188,705 | B1 | 2/2001 | Krainak et al. |
| 6,275,629 | B1 | 8/2001 | Eggleton et al. |
| 6,303,040 | B1 | 10/2001 | Oh et al. |
| 6,348,358 | B1 | 2/2002 | Sousa et al. |
| 6,411,746 | B1 | 6/2002 | Chamberlain et al. |
| 6,480,513 | B1 | 11/2002 | Kapany et al. |
| 6,683,895 | B2 | 1/2004 | Pilgrim et al. |
| 6,741,629 | B1 | 5/2004 | Garnache et al. |
| 6,853,671 | B2 | 2/2005 | Liu et al. |
| 6,880,983 | B2 * | 4/2005 | Stewart et al. ............... 385/92 |
| 6,917,636 | B2 | 7/2005 | Blauvelt et al. |
| 6,920,159 | B2 | 7/2005 | Sidorin et al. |
| 6,974,260 | B2 | 12/2005 | Scheibenreif et al. |
| 7,027,469 | B2 | 4/2006 | Sidorin et al. |
| 7,184,621 | B1 * | 2/2007 | Zhu ............................. 385/24 |
| 7,711,219 | B2 * | 5/2010 | McDonald et al. ........... 385/27 |
| 7,899,105 | B1 | 3/2011 | Hargis et al. |
| 7,965,949 | B1 | 6/2011 | Wach |
| 2001/0017960 | A1 | 8/2001 | Terahara |
| 2002/0131122 | A1 | 9/2002 | Anderl et al. |
| 2003/0044131 | A1 * | 3/2003 | Stewart et al. ............... 385/92 |
| 2003/0152390 | A1 * | 8/2003 | Stewart et al. ............... 398/135 |
| 2005/0025449 | A1 * | 2/2005 | Dirkson et al. ............... 385/147 |
| 2005/0152663 | A1 * | 7/2005 | Bench et al. ................. 385/147 |
| 2006/0215713 | A1 | 9/2006 | Flanders et al. |
| 2006/0215970 | A1 * | 9/2006 | Mizue et al. .................. 385/92 |
| 2007/0133647 | A1 | 6/2007 | Daiber |
| 2007/0223552 | A1 | 9/2007 | Muendel et al. |
| 2008/0259972 | A1 | 10/2008 | Heanue et al. |
| 2008/0267246 | A1 | 10/2008 | Volodin et al. |
| 2009/0122493 | A1 * | 5/2009 | Hosking et al. ............... 361/719 |
| 2009/0185586 | A1 | 7/2009 | Jhung et al. |
| 2009/0269069 | A1 * | 10/2009 | Mahgerefteh et al. ........ 398/82 |
| 2010/0208756 | A1 | 8/2010 | Noh |
| 2010/0232458 | A1 | 9/2010 | Kim et al. |
| 2010/0266283 | A1 | 10/2010 | Beckett |
| 2011/0058771 | A1 | 3/2011 | Lee et al. |
| 2011/0135309 | A1 | 6/2011 | Lee et al. |
| 2012/0039572 | A1 | 2/2012 | Amirkiai et al. |
| 2012/0093184 | A1 | 4/2012 | Krishnamoorthy et al. |
| 2012/0189323 | A1 | 7/2012 | Xu et al. |
| 2014/0161455 | A1 * | 6/2014 | Ho et al. ...................... 398/70 |
| 2014/0161457 | A1 * | 6/2014 | Ho et al. ...................... 398/79 |
| 2014/0161459 | A1 * | 6/2014 | Ho et al. ...................... 398/79 |

FOREIGN PATENT DOCUMENTS

| | | | |
|---|---|---|---|
| KR | 20000051030 | A | 8/2000 |
| WO | 03012936 | A2 | 2/2003 |

OTHER PUBLICATIONS

Lee, San-Liang et al., "Trend and Applications of Tunable Semiconductor Lasers", Optoelectronic Materials and Devices II, Proc. of SPIE vol. 6782, 67821H, 2007, Taipei, Taiwan R.O.C., 10 pgs.

Palmer, Christopher, "Diffraction Gratings—The Crucial Dispersive Component", The Baseline, reprinted from Spectroscopy, vol. 10, No. 2, Feb. 1995, pp. 14-15.

PCT International Search Report and Written Opinion mailed May 23, 2014, received in corresponding PCT Application No. PCT/US2014/014607, 11 pgs.

* cited by examiner

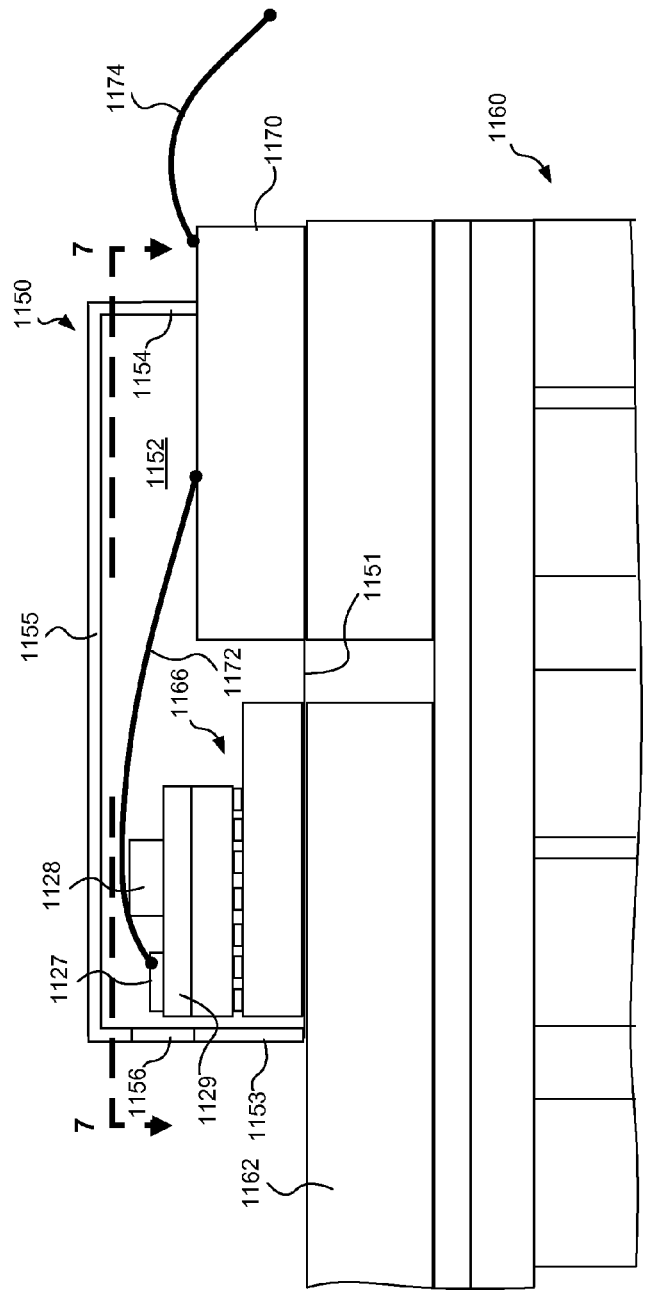
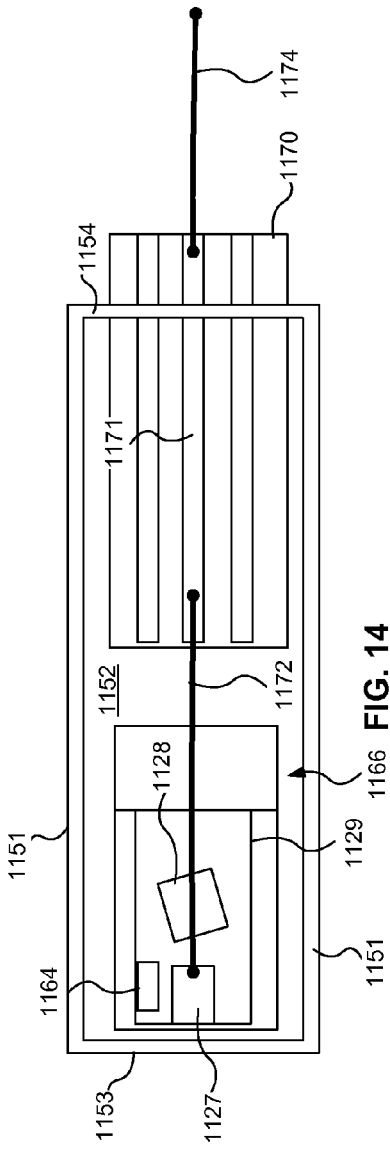
FIG. 13
FIG. 14

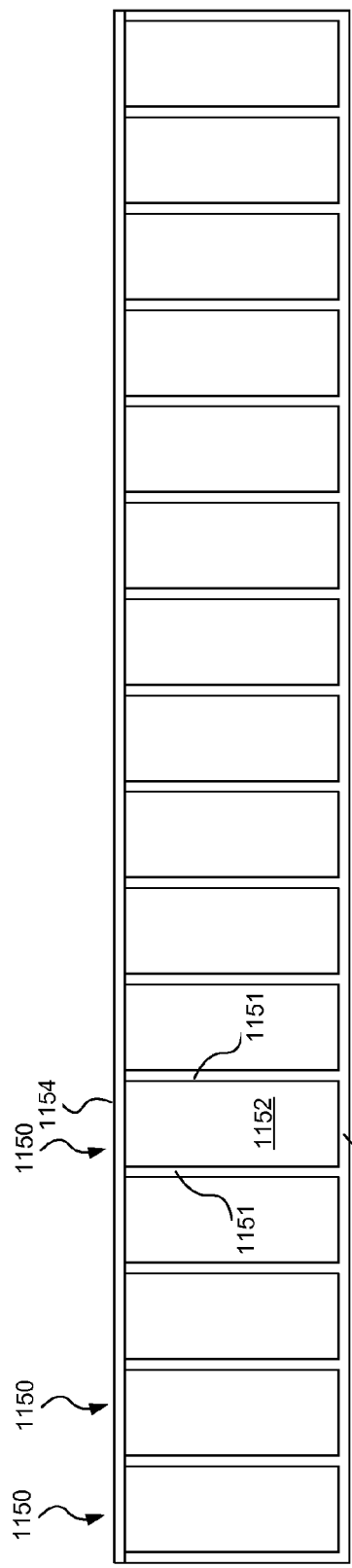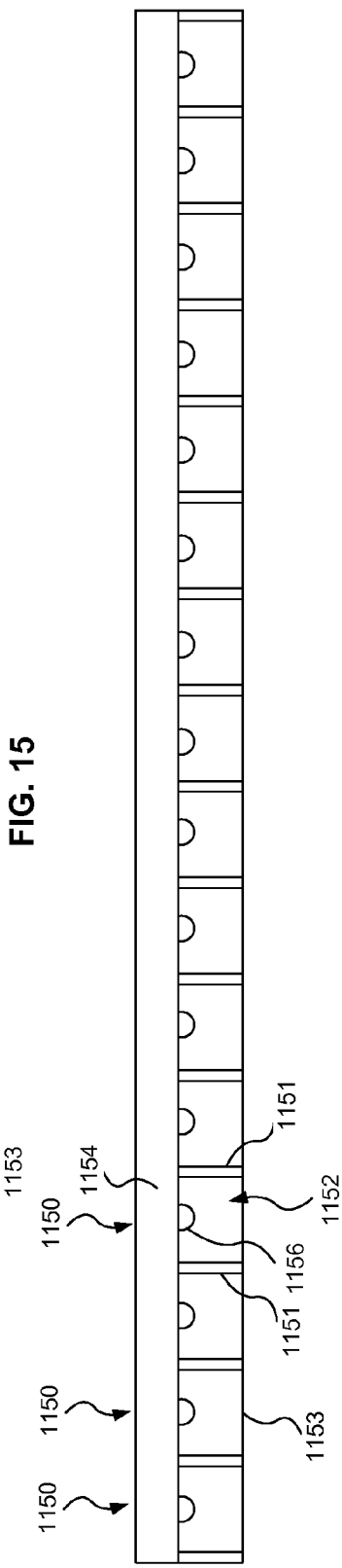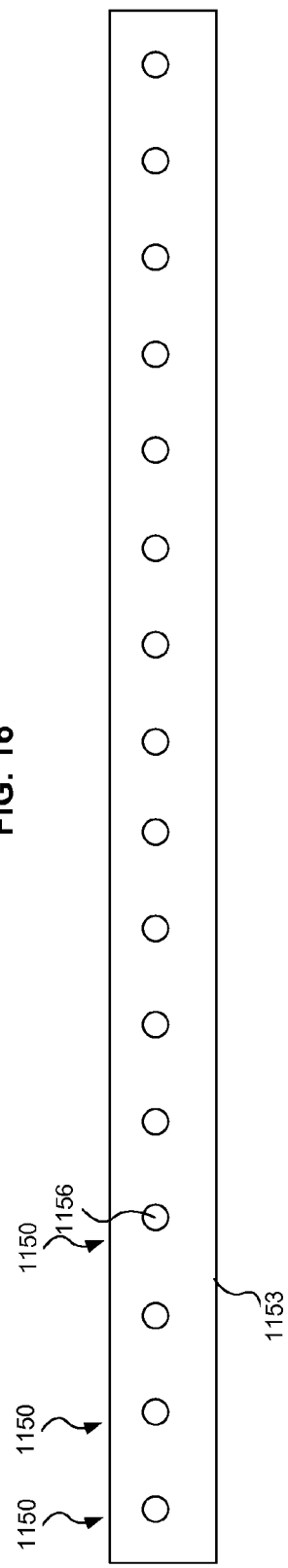

THERMALLY SHIELDED MULTI-CHANNEL TRANSMITTER OPTICAL SUBASSEMBLY AND OPTICAL TRANSCEIVER MODULE INCLUDING SAME

CROSS-REFERENCE TO RELATED APPLICATIONS

The present application is a continuation-in-part of U.S. patent application Ser. No. 13/708,569 filed Dec. 7, 2012, which is fully incorporated herein by reference.

TECHNICAL FIELD

The present disclosure relates to multi-channel optical transmitters or transceivers and more particularly, to a thermally shielded multi-channel transmitter optical subassembly (TOSA).

BACKGROUND INFORMATION

Optical communications networks, at one time, were generally "point to point" type networks including a transmitter and a receiver connected by an optical fiber. Such networks are relatively easy to construct but deploy many fibers to connect multiple users. As the number of subscribers connected to the network increases and the fiber count increases rapidly, deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. One challenge in developing such a PON is utilizing the capacity in the trunk fiber efficiently in order to transmit the maximum possible amount of information on the trunk fiber. Fiber optic communications networks may increase the amount of information carried on a single optical fiber by multiplexing different optical signals on different wavelengths using wavelength division multiplexing (WDM). In a WDM-PON, for example, the single trunk fiber carries optical signals at multiple channel wavelengths to and from the optical branching point and the branching point provides a simple routing function by directing signals of different wavelengths to and from individual subscribers. In this case, each subscriber may be assigned one or more of the channel wavelengths on which to send and/or receive data.

To transmit and receive optical signals over multiple channel wavelengths, the OLT in a WDM-PON may include a multi-channel transmitter optical subassembly (TOSA) and a multi-channel receiver optical subassembly (ROSA). OLT transceiver modules often are designed to fit a relatively small form factor. One example of a TOSA includes an array of lasers optically coupled to an arrayed waveguide grating (AWG) to combine multiple optical signals at multiple channel wavelengths. The desired accuracy or precision of the wavelengths in a WDM-PON often depends on the number and spacing of the channel wavelengths and may be controlled in the TOSA by controlling temperature.

One challenge with such OLT transceiver modules is providing temperature control of the laser array and AWG in a relatively small space and with relatively low power consumption to prevent external heat from adversely affecting the laser wavelengths. In a multi-channel TOSA including a laser array, for example, the temperature of each laser may be affected by adjacent lasers as well as the thermal air flow throughout the TOSA.

BRIEF DESCRIPTION OF THE DRAWINGS

These and other features and advantages will be better understood by reading the following detailed description, taken together with the drawings wherein:

FIG. 13 is a side cross-sectional view of a thermally shielded laser in the multi-channel TOSA shown in FIG. 11.

FIG. 14 is a top cross-sectional view of the thermally shielded laser taken along line 13-13 in FIG. 13.

FIG. 15 is a bottom plan view of the plurality of laser thermal shields used in the multi-channel TOSA shown in FIG. 11.

FIG. 16 is a back end view of the laser thermal shields shown in FIG. 15.

FIG. 17 is a front end view of the laser thermal shields shown in FIG. 15.

DETAILED DESCRIPTION

A thermally shielded multi-channel transmitter optical subassembly (TOSA), consistent with embodiments described herein, may be used in a multi-channel optical transceiver. The multi-channel TOSA generally includes an array of lasers optically coupled to an arrayed waveguide grating (AWG) to combine multiple optical signals at different channel wavelengths. A plurality of laser array thermal shields are thermally coupled to a temperature control device, such as a thermoelectric cooler (TEC), and thermally shield the respective lasers in the laser array in separate thermally shielded compartments. Each of the lasers may also be individually thermally controlled to provide a desired wavelength, for example, using a heater and/or cooler located in each thermally shielded compartment. The optical transceiver may be used in a wavelength division multiplexed (WDM) optical system, for example, in an optical line terminal (OLT) in a WDM passive optical network (PON).

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like and "optically coupled" refers to coupling such that light from one element is imparted to another element. Such "coupled" devices are not necessarily directly connected to one another and may be separated by intermediate components or devices that may manipulate or modify such signals. As used herein, "thermally coupled" refers to a direct or indirect connection or contact between two components resulting in heat being conducted from one component to the other component and "thermally isolated" refers to an arrangement where heat is prevented from being conducted to the isolated component from an external environment. In a thermally isolated multi-channel TOSA, for example, heat external to the TOSA is prevented from being conducted to one or more components in the TOSA. As used herein, "thermally shielded" refers to an arrangement that prevents heat from being transferred by convection or radiation to the shielded component. Thermally isolated and thermally shielded do not necessarily require an arrangement to prevent all heat from being conducted or transferred.

Figure 1:
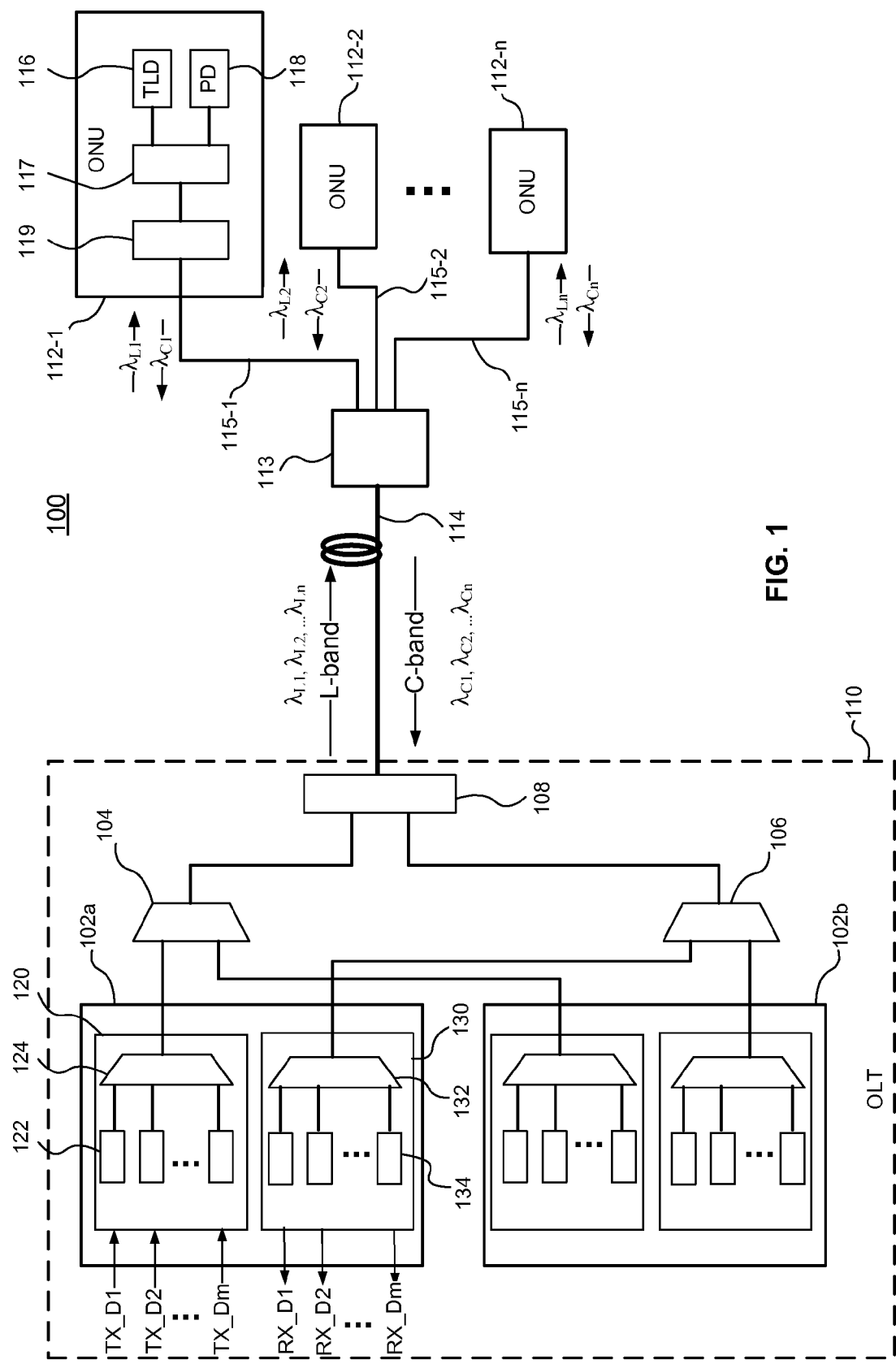
FIG. 1 is a functional block diagram of a wavelength division multiplexed (WDM) passive optical network (PON) including at least one multi-channel optical transceiver, consistent with embodiments of the present disclosure.

Referring to FIG. 1, a WDM-PON 100 including one or more multi-channel optical transceivers 102a, 102b, consistent with embodiments of the present disclosure, is shown and described. The WDM-PON 100 provides a point-to-multipoint optical network architecture using a WDM system. According to one embodiment of the WDM-PON 100, at least one optical line terminal (OLT) 110 may be coupled to a plurality of optical networking terminals (ONTs) or optical networking units (ONUs) 112-1 to 112-n via optical fibers, waveguides, and/or paths 114, 115-1 to 115-n. Although the OLT 110 includes two multi-channel optical transceivers 102a, 102b in the illustrated embodiment, the OLT 110 may include one or more multi-channel optical transceivers.

The OLT 110 may be located at a central office of the WDM-PON 100, and the ONUs 112-1 to 112-n may be located in homes, businesses or other types of subscriber location or premises. A branching point 113 (e.g., a remote node) couples a trunk optical path 114 to the separate optical paths 115-1 to 115-n to the ONUs 112-1 to 112-n at the respective subscriber locations. The branching point 113 may include one or more passive coupling devices such as a splitter or optical multiplexer/demultiplexer. In one example, the ONUs 112-1 to 112-n may be located about 20 km or less from the OLT 110.

The WDM-PON 100 may also include additional nodes or network devices, such as Ethernet PON (EPON) or Gigabit PON (GPON) nodes or devices, coupled between the branching point 113 and ONUs 112-1 to 112-n at different locations or premises. One application of the WDM-PON 100 is to provide fiber-to-the-home (FTTH) or fiber-to-the-premises (FTTP) capable of delivering voice, data, and/or video services across a common platform. In this application, the central office may be coupled to one or more sources or networks providing the voice, data and/or video.

In the WDM-PON 100, different ONUs 112-1 to 112-n may be assigned different channel wavelengths for transmitting and receiving optical signals. In one embodiment, the WDM-PON 100 may use different wavelength bands for transmission of downstream and upstream optical signals relative to the OLT 110 to avoid interference between the received signal and back reflected transmission signal on the same fiber. For example, the L-band (e.g., about 1565 to 1625 nm) may be used for downstream transmissions from the OLT 110 and the C-band (e.g., about 1530 to 1565 nm) may be used for upstream transmissions to the OLT 110. The upstream and/or downstream channel wavelengths may generally correspond to the ITU grid. In one example, the upstream wavelengths may be aligned with the 100 GHz ITU grid and the downstream wavelengths may be slightly offset from the 100 GHz ITU grid.

The ONUs 112-1 to 112-n may thus be assigned different channel wavelengths within the L-band and within the C-band. Transceivers or receivers located within the ONUs 112-1 to 112-n may be configured to receive an optical signal on at least one channel wavelength in the L-band (e.g., $\lambda_{L1}$, $\lambda_{L2}$, ... $\lambda_{Ln}$). Transceivers or transmitters located within the ONUs 112-1 to 112-n may be configured to transmit an optical signal on at least one channel wavelength in the C-band (e.g., $\lambda_{C1}$, $\lambda_{C2}$, ... $\lambda_{Cn}$). Other wavelengths and wavelength bands are also within the scope of the system and method described herein.

The branching point 113 may demultiplex a downstream WDM optical signal (e.g., $\lambda_{L1}, \lambda_{L2}, \ldots \lambda_{Ln}$) from the OLT 110 for transmission of the separate channel wavelengths to the respective ONUs 112-1 to 112-n. Alternatively, the branching point 113 may provide the downstream WDM optical signal to each of the ONUs 112-1 to 112-n and each of the ONUs 112-1 to 112-n separates and processes the assigned optical channel wavelength. The individual optical signals may be encrypted to prevent eavesdropping on optical channels not assigned to a particular ONU. The branching point 113 also combines or multiplexes the upstream optical signals from the respective ONUs 112-1 to 112-n for transmission as an upstream WDM optical signal (e.g., $\lambda_{C1}, \lambda_{C2}, \ldots \lambda_{Cn}$) over the trunk optical path 114 to the OLT 110.

One embodiment of the ONU 112-1 includes a laser 116, such as a laser diode, for transmitting an optical signal at the assigned upstream channel wavelength ($\lambda_{C1}$) and a photodetector 118, such as a photodiode, for receiving an optical signal at the assigned downstream channel wavelength ($\lambda_{L1}$). The laser 116 may include a tunable laser configured to be tuned to the assigned channel wavelength. This embodiment of the ONU 112-1 may also include a diplexer 117 coupled to the laser 116 and the photodetector 118 and a C+L band filter 119 coupled to the diplexer 117, which allow the L-band channel wavelength ($\lambda_{L1}$) to be received by the ONU 112-1 and the C-band channel wavelength ($\lambda_{C1}$) to be transmitted by the ONU 112-1.

The OLT 110 may be configured to generate multiple optical signals at different channel wavelengths (e.g., $\lambda_{L1}, \lambda_{L2}, \ldots \lambda_{Ln}$) and to combine the optical signals into the downstream WDM optical signal carried on the trunk optical fiber or path 114. Each of the OLT multi-channel optical transceivers 102a, 102b may include a multi-channel transmitter optical subassembly (TOSA) 120 for generating and combining the optical signals at the multiple channel wavelengths. The OLT 110 may also be configured to separate optical signals at different channel wavelengths (e.g. $\lambda_{C1}, \lambda_{C2}, \ldots \lambda_{Cn}$) from an upstream WDM optical signal carried on the trunk path 114 and to receive the separated optical signals. Each of the OLT multi-channel optical transceivers 102a, 102b may thus include a multi-channel receiver optical subassembly (ROSA) 130 for separating and receiving the optical signals at multiple channel wavelengths.

One embodiment of the multi-channel TOSA 120 includes an array of lasers 122, such as laser diodes, which may be modulated by respective RF data signals (TX_D1 to TX_Dm) to generate the respective optical signals. The lasers 122 may be modulated using various modulation techniques including external modulation and direct modulation. An optical multiplexer 124, such as an arrayed waveguide grating (AWG), combines the optical signals at the different respective downstream channel wavelengths (e.g., $\lambda_{L1}, \lambda_{L2}, \ldots \lambda_{Lm}$).

In some embodiments, the lasers 122 may be tunable lasers that generate the optical signals at the respective channel wavelengths. In other embodiments, the lasers 122 may generate optical signals over a band of channel wavelengths and filtering and/or multiplexing techniques may be used to produce the assigned channel wavelengths. Examples of optical transmitters including a laser array and AWG are disclosed in greater detail in U.S. patent application Ser. No. 13/543,310 (U.S. Patent Application Pub. No. 20130016971), U.S. patent application Ser. No. 13/357,130 (U.S. Patent Application Pub. No. 20130016977), and U.S. patent application Ser. No. 13/595,505 (U.S. Patent Application Pub. No. 20130223844), all of which are fully incorporated herein by reference. In the illustrated embodiment, the OLT 110 further includes a multiplexer 104 for multiplexing the multiplexed optical signal from the multi-channel TOSA 120 in the multi-channel transceiver 102a with a multiplexed optical signal from a multi-channel TOSA in the other multi-channel transceiver 102b to produce the downstream aggregate WDM optical signal.

The lasers 122 may include, for example, distributed feedback (DFB) lasers with diffraction gratings that provide optical feedback for the laser and that alter the lasing wavelength in response to temperature changes. The TOSA 120 may also include a temperature control system for controlling temperature of the lasers 122 and/or the multiplexer 124 to maintain a desired wavelength precision or accuracy. Each of the lasers 122 may also be thermally shielded and/or thermally isolated to maintain a desired temperature of the laser and a desired wavelength precision or accuracy, as described in greater detail below.

One embodiment of the multi-channel ROSA 130 includes a demultiplexer 132 for separating the respective upstream channel wavelengths (e.g., $\lambda_{C1}, \lambda_{C2}, \ldots \lambda_{Cn}$). An array of photodetectors 134, such as photodiodes, detects the optical signals at the respective separated upstream channel wavelengths and provides the received data signals (RX_D1 to RX_Dm). In the illustrated embodiment, the OLT 110 further includes a demultiplexer 106 for demultiplexing the upstream WDM optical signal into first and second WDM optical signals provided to the respective multi-channel ROSA in each of the transceivers 102a, 102b. The OLT 110 also includes a diplexer 108 between the trunk path 114 and the multiplexer 104 and the demultiplexer 106 such that the trunk path 114 carries both the upstream and the downstream channel wavelengths. The transceivers 102a, 102b may also include other components, such as laser drivers, transimpedance amplifiers (TIAs), and control interfaces, used for transmitting and receiving optical signals.

In one example, each of the multi-channel optical transceivers 102a, 102b may be configured to transmit and receive 16 channels such that the WDM-PON 100 supports 32 downstream L-band channel wavelengths and 32 upstream C-band channel wavelengths. In one example, the downstream L-band link between the OLT transceivers 102a, 102b and the ONUs 112-1 to 112-n may support a power budget of at least about 26 dB and the upstream C-band link between the ONUs 112-1 to 112-n and the OLT transceivers 102a, 102b may support a power budget of at least about 23 dB. One example of the WDM-PON 100 may operate at 1.25 Gbaud using 8B/10B encoded on-off keying as the modulation scheme. Other data rates and modulation schemes may also be used.

As mentioned above, the upstream and downstream channel wavelengths may span a range of channel wavelengths on the 100 GHz ITU grid. Each of the transceivers 102a, 102b, for example, may cover 16 channel wavelengths in the L-band for the TOSA and 16 channel wavelengths in the C-band for the ROSA such that the transceivers 102a, 102b together cover 32 channels. Thus, the multiplexer 104 may combine 16 channels from one transceiver 102a with 16 channels from the other transceiver 102b, and the demultiplexer 106 may separate a 32 channel WDM optical signal into two 16 channel WDM optical signals. To facilitate use of the multiplexer 104 and the demultiplexer 106, the range of channel wavelengths may skip channels (e.g., 2 channels) in the middle of the range. According to one example of a multi-channel optical transceiver used in the WDM-PON 100, the desired wavelength precision or accuracy is ±0.05 nm, the desired operating temperature range is between −5 and 70° C., and the desired power dissipation is about 16.0 W.

Figure 2:
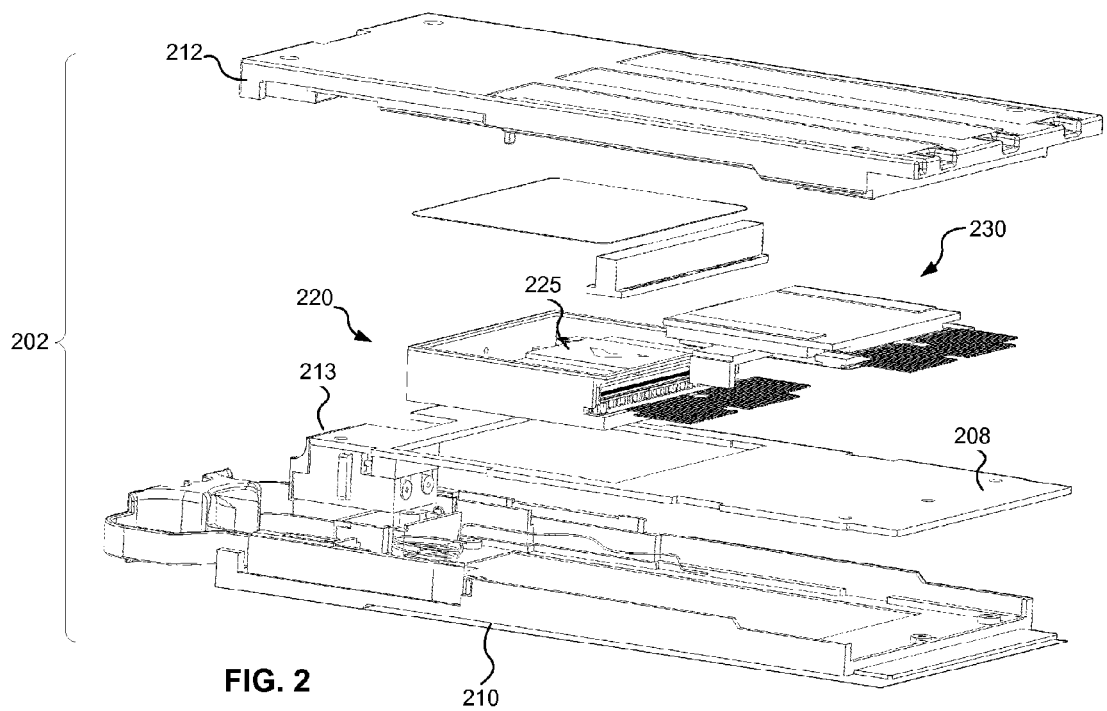
FIG. 2 is an exploded view of a multi-channel optical transceiver including a thermally shielded multi-channel TOSA, consistent with an embodiment of the present disclosure.
Figure 3:
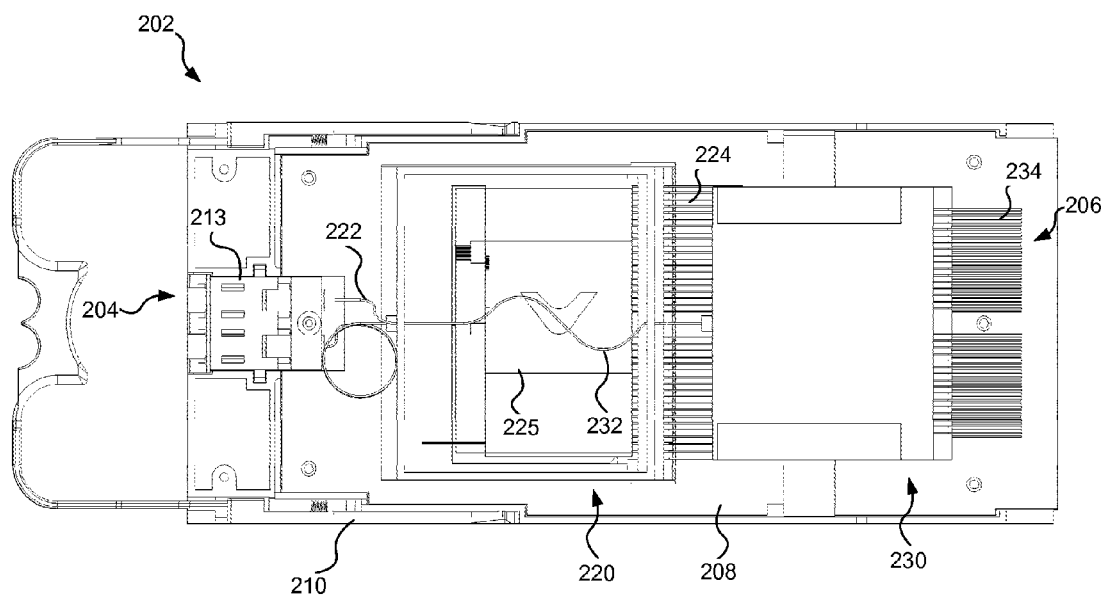
FIG. 3 is a top view inside the multi-channel optical transceiver shown in FIG. 2.

Referring to FIGS. 2 and 3, one embodiment of a multi-channel optical transceiver module 202 including a thermally shielded and/or isolated multi-channel TOSA 220 is shown and described in greater detail. As discussed above, multiple multi-channel transceiver modules may be used in an OLT of a WDM-PON to cover a desired channel range. The transceiver module 202 and the multi-channel TOSA 220 within the transceiver module 202 may thus be designed to have a relatively small form factor with minimal space. The multi-channel optical transceiver module 202 generally provides an optical input and output at one end 204 and electrical input and output at another end 206. The transceiver module 202 includes a transceiver housing 210 containing the multi-channel TOSA 220, a multi-channel ROSA 230, and a dual fiber type direct link adapter 213 directly linked to the TOSA 220 and the ROSA 230 for providing the optical input and output.

The dual fiber type direct link adapter 213 is coupled to the TOSA 220 and to the ROSA 230 with respective optical fibers 222, 232 to provide the direct link between the adapter 250 and both the TOSA 220 and the ROSA 230. The dual fiber type direct link adapter 213 is also configured to receive pluggable optical connectors, such as LC connectors (not shown), to connect the TOSA 220 and ROSA 230, respectively, to fiber optic cables (not shown). When the pluggable optical connectors are plugged into the dual fiber type direct link adapter 213, the adapter 213 establishes an optical coupling between the TOSA 220 and the ROSA 230 and the respective optical fibers in the fiber-optic cables, which carry the optical signals to and from the transceiver.

The multi-channel TOSA 220 includes an array of lasers (not shown in FIGS. 2 and 3) coupled to an AWG 225. A temperature control system, as will be described in greater detail below, may control the temperature of the laser array and/or the AWG 225 using the same temperature control device. Each of the lasers is also thermally shielded from heat within the TOSA 220 and may be thermally isolated from heat external to the TOSA 220. The temperature of each of the lasers in the laser array may also be controlled individually, for example, to provide a desired wavelength with a desired wavelength precision or accuracy. In one example, the temperature of each laser is maintained within ±0.5° C. in the operating range between −5 and 70° C. to maintain a wavelength precision or accuracy of about ±0.05 nm.

The transceiver module 202 may also include one or more printed circuit boards 208 coupled to the TOSA 220 and/or ROSA 230. The printed circuit board(s) 208 may include circuitry and electronic components such as laser drivers, transimpedance amplifiers (TIAs), and control interfaces. The TOSA 220 is coupled to conductive leads 224 for carrying the electronic signals including the data to be transmitted by the TOSA 220. The ROSA 230 is coupled to the conductive leads 234 for carrying the electronic signals including the data received by the ROSA 230.

A top housing portion 212 encloses the TOSA 220, the ROSA 230, the adapter 250, the optical fibers 222, 232, and other components within the housing 210. The transceiver housing 210 may have a width of less than about 55 mm, a length of less than about 130 mm, and a height of less than about 10 mm. More specifically, one example of a transceiver housing 210 may have a width of 54.6 mm, a length of 110 mm, and a height of about 9.8 mm. Within the transceiver module 202, the thermally shielded multi-channel TOSA 220 has a width, a height and length capable of fitting within the transceiver housing 210.

Figure 4:
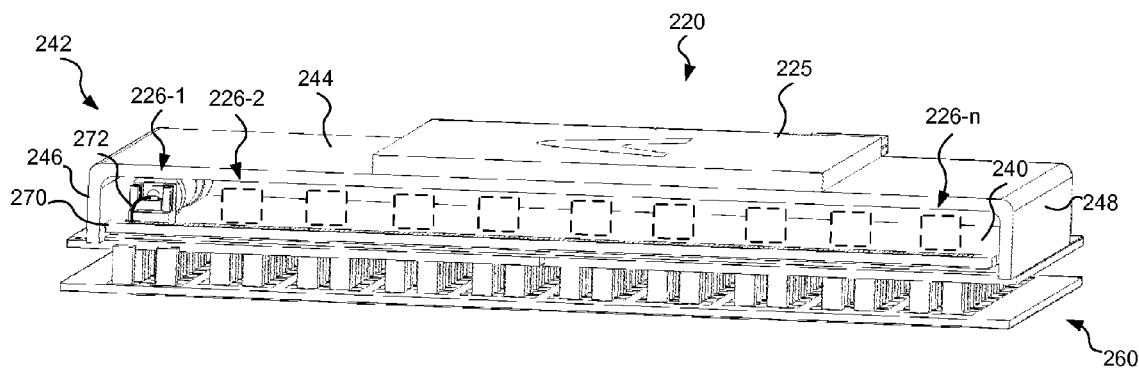
FIG. 4 is an end perspective view of a multi-channel TOSA including an array of thermally shielded lasers, consistent with an embodiment of the present disclosure.
Figure 5:
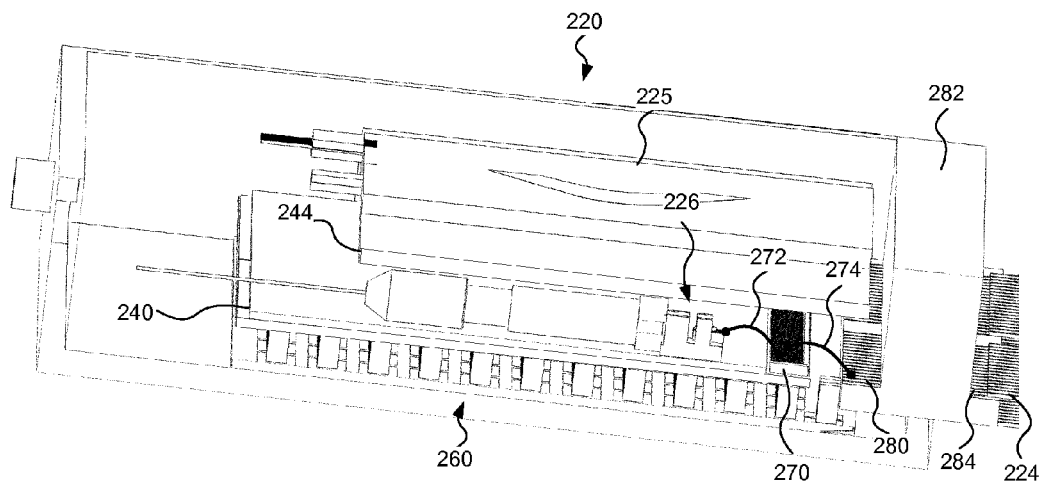
FIG. 5 is a side perspective, cross-sectional view of shown in FIG. 4 illustrating one of the thermally shielded lasers.

Referring to FIGS. 4 and 5, an embodiment of the thermally shielded and/or isolated multi-channel TOSA 220 is described in greater detail. Although the example embodiment is both thermally isolated and thermally shielded, the multi-channel TOSA 200 may be thermally isolated without being thermally shielded or thermally shielded without being thermally isolated. This embodiment of the thermally shielded and/or isolated multi-channel TOSA 220 includes an array of lasers 226-1 to 226-n (only laser 226-1 is shown in detail) optically coupled to the AWG 225. Each of the lasers 226-1 to 226-n in the array may be a distributed feedback (DFB) laser capable of altering lasing wavelengths in response to temperature changes and may be thermally shielded, as described in greater detail below. The lasers 226-1 to 226-n may be optically coupled to the AWG 225, for example, using low bending loss optical fibers (not shown). Each laser 226-1 may be provided as a laser package including, but not limited to, a laser diode chip mounted on a laser mounting structure or sub-mount. The laser package may also include optical components, such as a lens for optically coupling the laser light into a respective one of the optical fibers, and/or optoelectronic components, such as a monitor photodiode. The AWG 225 may include an AWG chip such as the type used for WDM, Coarse WDM (CWDM), or Dense (DWDM) multiplexing or demultiplexing.

In this embodiment, the array of lasers 226-1 to 226-n are supported on a laser array tray 240 and the AWG 225 is supported on an AWG tray 242. Both the laser array tray 240 and the AWG tray 242 may be thermally coupled to the same temperature control device 260 such that the temperature control device 260, the laser array tray 240 and the AWG tray 242 provide a temperature control system for the TOSA within a relatively small space. The temperature control device 260 may be a thermoelectric cooler, such as a Peltier device, for cooling the array of lasers 226-1 to 226-n and the AWG 225. In this embodiment, the AWG tray 242 supports the AWG 225 above the lasers 226-1 to 226-n. By using the same temperature control device and supporting the AWG 225 above the lasers 226-1 to 226-n, a desired temperature range can be maintained with relatively low power consumption and within a relatively small space.

In the illustrated embodiment, the AWG tray 242 includes a supporting portion 244 that supports the AWG 225 and side portions 246, 248 that hold the supporting portion 244 above the lasers 226-1 to 226-n. The laser array tray 240 may be a relatively flat plate that fits between the side portions 246, 248 such that both the laser array tray 240 and the side portions 246, 248 of the AWG tray 242 are separately thermally coupled to the temperature control device 260 (e.g., to the cold side of a TEC). The laser array tray 240 and the side portions 246, 248 of the AWG tray 242 may each directly contact the temperature control device 260 or may be thermally coupled through another thermally conductive material. Because a larger surface area of the laser array tray 240 is thermally coupled to the temperature control device 260, the temperature of the lasers 226-1 to 226-n may be controlled more precisely. Although the illustrated embodiment shows a particular shape for the trays 240, 242, other shapes may also be used to support the lasers 226-1 to 226-n and the AWG 225 and to provide thermal coupling to the same temperature control device 260. Each of the trays 240, 242 may also be formed as one piece or multiple pieces.

Both of the trays 240, 242 may be made of a thermally conductive material having a thermal conductivity greater than 60 W/(m·K) and more specifically greater than 80 W/(m·K). The trays 240, 242 may be made, for example of copper or zinc. At least a portion of the trays 240, 242 may also be gold plated, for example, to facilitate soldering to the trays 240, 242. In one example, the laser array tray 240 is made of AlN with a thermal conductivity of about 170 W/(m·K) and the AWG tray 242 is made of copper with Au plating and having a thermal conductivity of greater than 300 W/(m·K).

Figure 6:
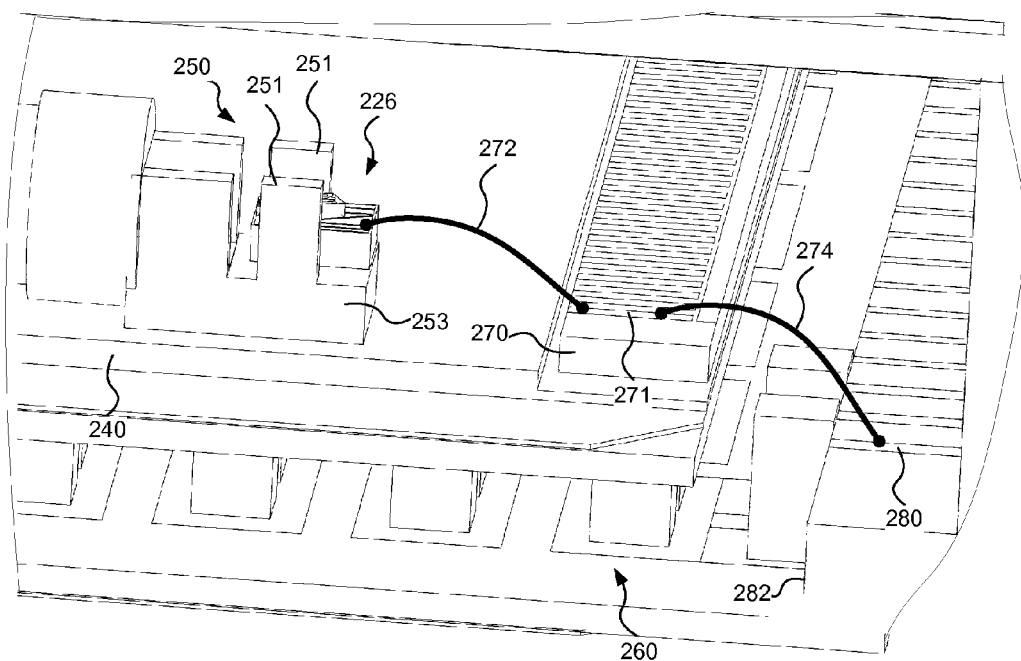
FIG. 6 is an enlarged perspective view of the multi-channel TOSA and the thermally shielded laser shown in FIG. 5.
Figure 7:
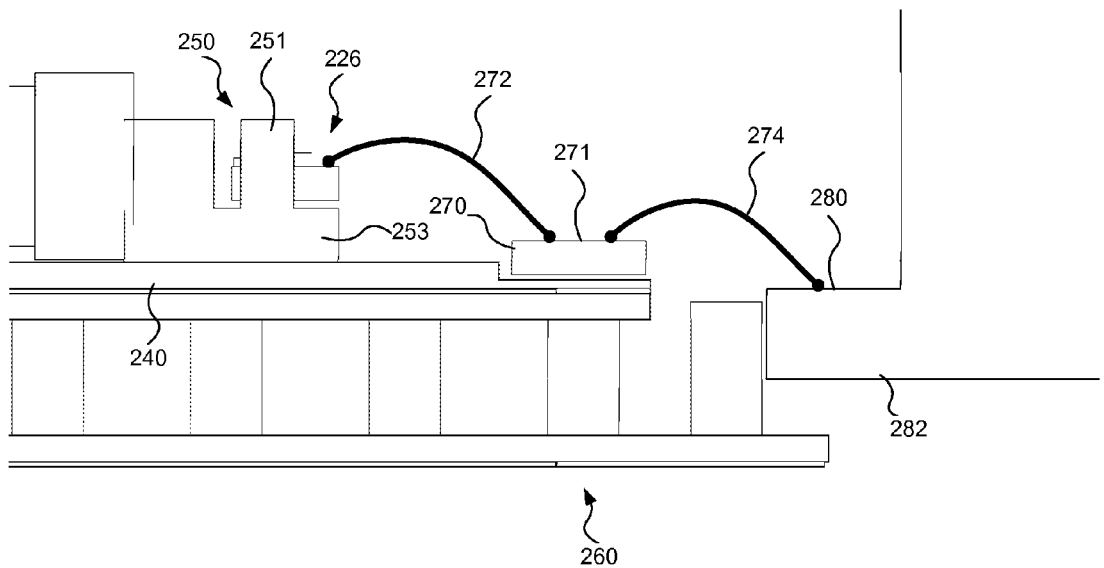
FIG. 7 is a side view of the multi-channel TOSA and the thermally shielded laser shown in FIG. 6.

To provide thermal isolation in this embodiment, as shown in greater detail in FIGS. 6 and 7, the multi-channel TOSA 220 also includes a thermal isolation bar 270 for providing electrical connections between the lasers 226-1 to 226-n (and/or other components) and external circuitry. The thermal isolation bar 270 is thermally coupled to the temperature control device 260 (e.g., to the cold side of a TEC) to prevent heat from being conducted to the lasers 226-1 to 226-n. In particular, the thermal isolation bar 270 may directly contact the temperature control device 260 or may contact the laser array tray 240. In the illustrated embodiment, the thermal isolation bar 270 extends across the array of lasers 226-1 to 226-n from one side to the other side of the TOSA 220. In other embodiments, the thermal isolation bar 270 may include multiple sections and/or may extend across only a portion of the TOSA 220. Each of the lasers 226 (and/or other optoelectronic components) is wire bonded with at least one wire 272 to a conductive pad 271 on the thermal isolation bar 270. Although a single laser 226 is shown with a single wire 272, multiple wires 272 may be used to wire bond each of the lasers (e.g., lasers 226-1 to 226-n shown in FIG. 4) to separate conductive pads on the thermal isolation bar 270. Although the thermal isolation bar 270 is shown having a rectangular shape, other shapes and configurations are possible.

The thermal isolation bar 270 provides an electrical connection between the lasers 226 and external circuitry, such as the printed circuit board 208. As shown, for example, the thermal isolation bar 270 is wire bonded with wires 274 to conductive pads 280 located on a TOSA housing portion 282. The conductive pads 280 are electrically connected to circuitry, for example, via conductive traces or paths 284 extending through the housing portion 282 and via the conductive leads 224 (see FIG. 5). Multiple wires 274 may be used between respective conductive pads 271 on the thermal isolation bar 270 and the conductive pads 280 on the housing portion 282 to provide multiple electrical connections between each of the lasers in a laser array and the circuitry. Although a specific arrangement providing an electrical connection to external circuitry is illustrated and described, other arrangements may also provide an electrical connection to the circuitry.

Because the thermal isolation bar 270 is thermally coupled to the temperature control device 260, the temperature of the thermal isolation bar 270 may be controlled (e.g., by cooling or heating) to prevent heat from being conducted from the pads 280, which are linked to the external environment, to the lasers 226. The thermal isolation bar 270 thus isolates the lasers 226 from the external heat generated in the environment external to the TOSA 220 while allowing the lasers 226 to be electrically connected to circuitry outside of the TOSA 220. The thermal isolation bar 270 may be made of a thermally conductive material having a thermal conductivity greater than 60 W/(m·K), such as, for example, aluminum nitride (AlN). The conductive traces or paths on the thermal isolation bar 270 may include gold, for example, to facilitate solderability.

Figure 8:
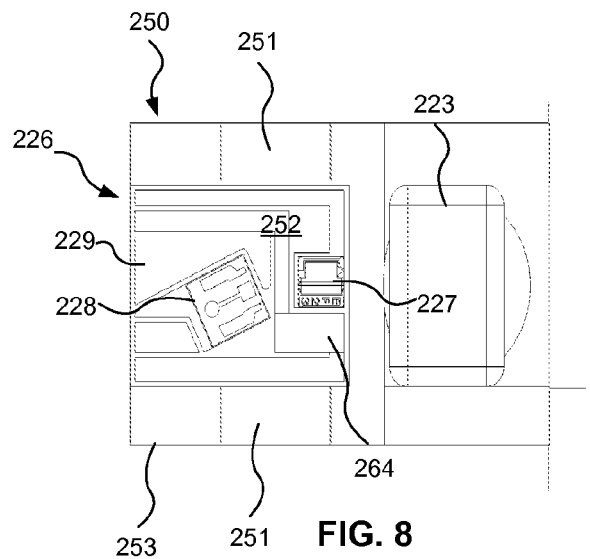
FIGS. 8 and 9 are top and perspective views, respectively, of one embodiment of a thermally shielded laser.
Figure 9:
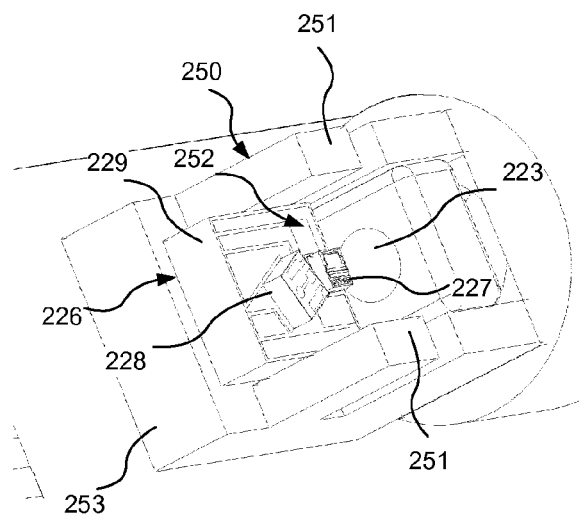
Figure 10:
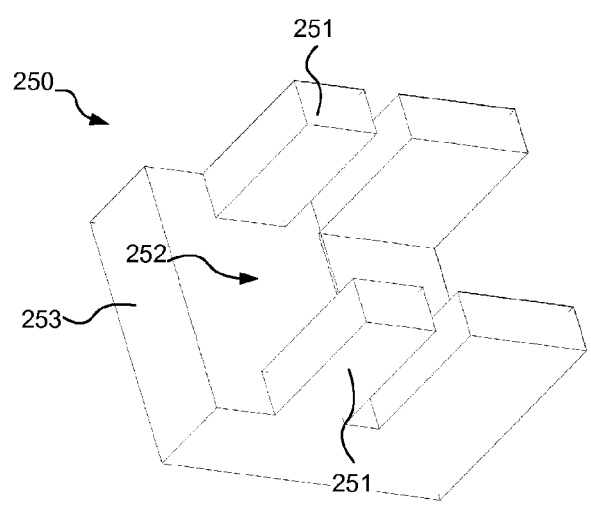
FIG. 10 is a perspective view of the laser thermal shield used in the thermally shielded laser shown in FIGS. 8 and 9.
Figure 11:
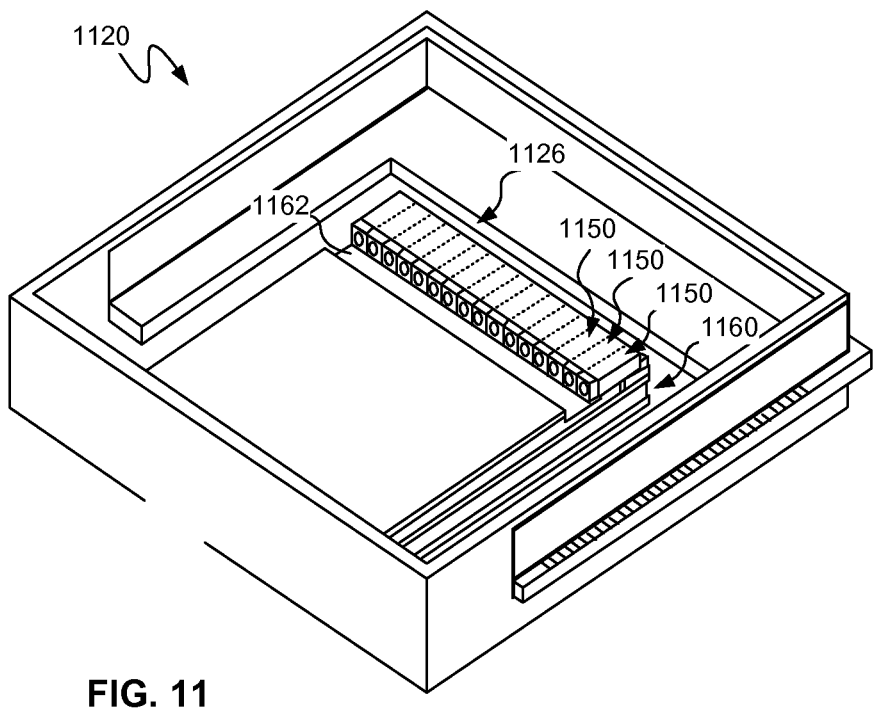
FIG. 11 is top perspective view of a multi-channel TOSA including an array of thermally shielded lasers, consistent with another embodiment of the present disclosure.

As shown in greater detail in FIGS. 8-10, each laser 226 may be thermally shielded by a laser thermal shield 250 defining a thermally shielded compartment 252. In this embodiment, the laser thermal shield 250 includes walls 251 extending from a base 253 to define the thermally shielded compartment 251. The laser thermal shield 250 is thermally coupled to the temperature control device 260, for example, via the laser tray 240. The temperature control device 260 may thus maintain a consistent temperature (e.g., 40° C.) of the laser thermal shield 250 such that the walls 251 of the thermal shield 250 thermally shield the laser 226 from heat within the TOSA (e.g., from other lasers and/or from thermal air flow in the TOSA). Although a single thermal shield 250 is shown thermally shielding a single laser 226, a plurality of thermal shields may be used to thermally shield the respective lasers 226-1 to 226-*n* in the laser array.

The laser array thermal shield 250 may be made of a thermally conductive material having a thermal conductivity greater than 60 W/(m·K) and more specifically greater than 80 W/(m·K) and, for example, about 160 W/(m·K). The laser array thermal shield 440 may be made, for example, from copper tungsten and may also be gold plated, for example, to facilitate soldering. Other thermally conductive materials may also be used.

As shown, the laser 226 includes a laser diode chip 227 (e.g., a DFB laser diode chip) mounted on a sub-mount 229. The thermally shielded compartment 252 is configured to receive the sub-mount 229 between the walls 251. A monitor photodiode 228 may also be mounted on the sub-mount 229, for example, to monitor light emitted from the laser diode chip 227. A heater 264, such as a resistor, may be located adjacent the laser diode chip 227 to provide independent control of the temperature of the laser diode chip 227 and thus the wavelength of the emitted laser light. During operation, for example, the temperature control device 260 may be used to maintain a consistent baseline temperature of the array of lasers 226-1 to 226-*n* and the heaters 264 may be used to raise the temperature of each of the lasers 226 individually and independently above this baseline temperature to change the wavelength. The thermal shield 250 facilitates this independent temperature control of each of the lasers by preventing heat from outside of the thermally shielded compartment 252 from affecting the laser diode chip 227. In other embodiments, other temperature control devices, such as a micro TEC, may be used to provide the individual and independent temperature control of the laser diode chip 227.

The illustrated embodiment of the laser thermal shield 250 is also configured to receive a lens 223, for example, to focus emitted laser light into an optical fiber or waveguide. As shown, the laser thermal shield 250 also receives and supports the lens such that the laser diode chip 227 is aligned with the lens 223. Although the illustrated embodiment shows the laser thermal shield 250 with a particular shape, other shapes and configurations are also possible. In other embodiments, for example, the laser thermal shield 250 may be closed at the top.

FIGS. 11-17 illustrate another embodiment of a thermally shielded multi-channel TOSA 1120. In this embodiment, a plurality of laser thermal shields 1150 are integrated as a one piece and define a plurality of thermally shielded compartments 1152 that enclose the lasers 1126 on the top and sides. The laser thermal shields 1150 also define windows 1156 that allow each of the lasers to emit laser light out of the compartments 1152. The lasers 1126 may include, for example, an array of DFB lasers capable of altering lasing wavelengths in response to temperature changes. The laser thermal shields 1150 provide thermal shielding for each of the lasers 1126 and thus may prevent heat from outside each of the thermally shielded compartments 1152 (e.g., from other lasers or from thermal air flow in the TOSA 1120) from affecting the lasers within the compartments 1152.

The thermally shielded multi-channel TOSA 1120 also includes a temperature control device 1160 thermally coupled to the array of lasers 1126 and the laser thermal shields 1150. The temperature control device 1160 may be a thermoelectric cooler, such as a Peltier device, for cooling the laser array 1126. In the illustrated embodiment, a thermally conductive base plate 1162 is located on the temperature control device 1160 and the lasers 1126 are mounted on the base plate 1162. At least a portion of the laser thermal shields 1150 may also contact the base plate 1162 to provide the thermal coupling between the temperature control device 1160 and the laser thermal shields 1150. The temperature control device 1160 may thus maintain a consistent temperature for each of the lasers 1126 and for each of the laser thermal shields 1150. In one example, the temperature control device 1160 maintains a temperature of the base plate 1162 at about 40° C. A temperature monitor, such as a thermistor, may be used to monitor the temperature of the base plate 1162 such that the base plate 1162 is maintained at the desired temperature.

Each of the thermally shielded compartments 1152 may also enclose one or more temperature control devices for independently controlling the temperature of each of the lasers 1126, as will be described in greater detail below. By thermally shielding the individual lasers, the laser thermal shield 1150 facilitates this independent temperature control and allows the temperature to be maintained within a desired range (e.g., within ±0.5° C. of a target temperature).

The laser thermal shields 1150 may be made of a thermally conductive material having a thermal conductivity greater than 60 W/(m·K) and more specifically greater than 80 W/(m·K) and, for example, about 160 W/(m·K). The laser thermal shields 1150 may be made, for example, from copper tungsten. Other thermally conductive materials may also be used. The base plate 1162 may also be made of a thermally conductive material having a thermal conductivity greater than greater than 60 W/(m·K) and more specifically greater than 80 W/(m·K).

The lasers 1126 may be optically coupled to an AWG (not shown in FIGS. 11 and 12), which is supported above the laser array on an AWG tray, for example, as described above. The example embodiment shows a sixteen (16) channel TOSA with sixteen (16) lasers in the laser array 1126 and sixteen corresponding thermally shielded compartments 1152; however, other numbers of channels, lasers and shielded compartments are possible.

Figure 12:
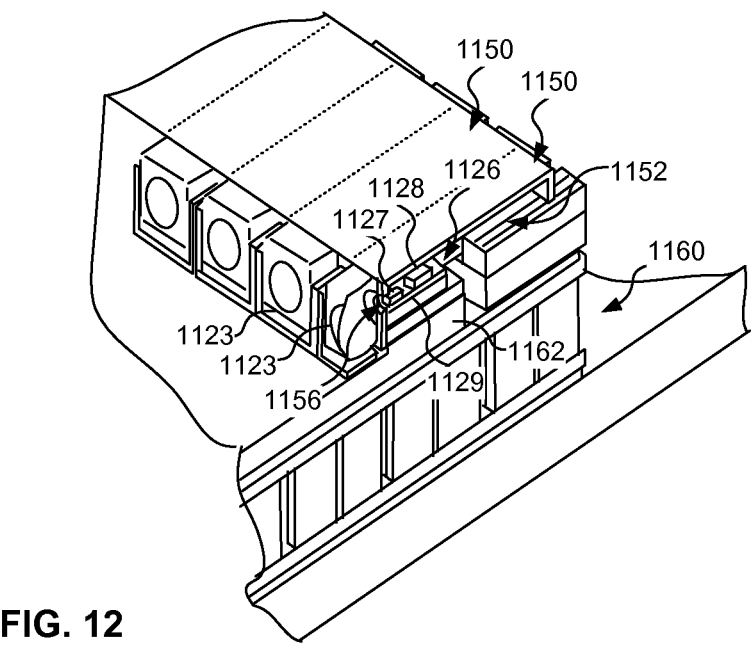
FIG. 12 is an enlarged, partially cross-sectional view of the array of thermally shielded lasers in the multi-channel TOSA shown in FIG. 11.

As shown in FIG. 12, each of the lasers 1126 includes a laser diode chip 1127 (e.g., a DFB laser diode chip) mounted on a sub-mount 1129 located in the thermally shielded compartment 1152. A photodiode 1128 may also be mounted on the sub-mount 1129 for monitoring the light emitted from the laser diode chip 1127. The laser diode chip 1127 is aligned with the window 1156 such that the laser light emitted from the laser diode chip 1127 passes through the window 1156. Other optical components may also be used to couple the laser light into optical fibers or waveguides (not shown). For example, a lens 1123 may be aligned with the window 1156 to focus and optically couple the emitted laser light into an optical fiber or waveguide (not shown).

FIGS. 13 and 14 show the thermally shielded compartment 1152 in greater detail. Each thermally shielded compartment 1152 may be formed by a front wall 1153, a rear wall 1154, side walls 1151 and a top portion 1155, which enclose the laser sub-mount 1129. One or more of the thermal shield walls 1153, 1154, 1151 also extend to the base plate 1162, which thermally couples the respective thermal shield 1150 to the temperature control device 1160. In the illustrated embodiment, for example, at least the side walls 1151 between the thermally shielded compartments 1152 contact the base plate 1162 to provide thermal isolation walls between each of the laser sub-mounts 1129, which shield and/or isolate each of the laser diode chips 1127 in the compartments 1152.

As shown in FIGS. 13 and 14, at least one temperature control device may be located in each of the thermally shielded compartments 1152 to provide individual and independent control of the temperature of each of the laser diode chips 1127. In one embodiment, the temperature control device is a micro thermoelectric cooler (TEC) 1166 located below the laser diode chip 1127 and thermally coupled to the laser sub-mount 1129. Alternatively or additionally, the temperature control device is a heater 1164, such as a resistor, located beside the laser diode chip 1127 on the sub-mount 1129. The micro TEC 1166 and/or heater 1164 allow the temperature of the laser diode chip 1127 to be controlled independently of other laser diode chips.

In this embodiment, a thermal isolation member 1170 extends partially into the thermally shielded compartment 1152 to provide an electrical connection from the laser diode chip 1127 (and other components) to external circuitry (e.g., outside the TOSA). The thermal isolation member 1170 is thermally coupled to the temperature control device 1160 (e.g., via the base plate 1162) such that the laser diode chip 1127 (and other electrically connected components) may be thermally isolated from the external environment. The laser diode chip 1127 is wire bonded with at least one wire 1172 to a conductive pad 1172 on the thermal isolation member 1170. Although a single wire 1172 is shown coupling the laser diode chip 1127 to the thermal isolation member 1170, multiple wires may be used to bond other electronic or optoelectronic components in the thermally shielded compartment 1152 to separate conductive pads on the thermal isolation member 1170.

The thermal isolation member 1170 provides an electrical connection between the laser diode chip 1127 and external circuitry, such as the printed circuit board 208 shown in FIG. 2. As shown, one end of the thermal isolation member 1170 extends outside of the thermally shielded compartment 1152 and is wire bonded with at least one wire 1174, for example, to conductive pads located on a TOSA housing portion (not shown). Because the thermal isolation member 1170 is thermally coupled to the temperature control device 1160, the temperature of the thermal isolation member 1170 may be controlled (e.g., by cooling or heating) to prevent heat from being conducted from the external environment to the laser diode chip 1127. The thermal isolation member 1170 thus isolates the laser diode chip 1127 from the external heat generated in the environment external to the TOSA while allowing each laser diode chip 1127 to be electrically connected to circuitry outside of the TOSA. Thermal isolation members 1170 may extend into each of the respective thermally shielded compartments 1152 of the laser array thermal shield 1150 to provide thermally-isolated electrical connections from each of the lasers 1126 (and other components) to external circuitry.

As shown in greater detail in FIGS. 15-17, the side walls 1151, front wall 1153, and rear wall 1154 of the laser thermal shields 1150 define the thermally shielded compartments 1152. The front wall 1153 defines the windows 1156 configured to allow the emitted laser light to pass out of the shielded compartments 1152. The rear wall 1154 is shorter to allow the thermal isolation members to extend out of the thermally shielded compartments 1152. Although the illustrated embodiment shows a particular shape for the laser array thermal shield 1150 and compartments 1152, other shapes may also be used. The laser array thermal shield 1150 may also be made as one piece or multiple pieces arranged together.

Accordingly, a thermally shielded multi-channel TOSA, consistent with embodiments described herein, allows multiple lasers in the TOSA to be shielded from temperature changes and to be temperature controlled individually. Thus, the multi-channel TOSA may provide precise channel wavelengths by controlling temperature with relatively low power consumption and in a relatively small space.

Consistent with an embodiment, a multi-channel transceiver module includes a transceiver housing and a thermally shielded multi-channel transmitter optical subassembly (TOSA) located in the transceiver housing and configured to transmit a wavelength division multiplexed (WDM) optical signal on multiple channel wavelengths. The TOSA includes an array of lasers configured to generate laser light, wherein each of the lasers is associated with different respective optical channels. The TOSA also includes a temperature control device and a plurality of laser thermal shields for thermally shielding the array of lasers. The laser thermal shields are thermally coupled to the temperature control device and define a plurality of thermally shielded compartments. Each of the thermally shielded compartments receives and thermally shields a respective one of the lasers while allowing emitted laser light to pass out of the shielded compartments. The multi-channel transceiver module also includes a multi-channel receiver optical subassembly (ROSA) located in the transceiver housing. The ROSA is configured to receive a wavelength division multiplexed (WDM) optical signal on multiple channel wavelengths.

Consistent with another embodiment, a thermally shielded multi-channel transmitter optical subassembly (TOSA) includes a TOSA housing, an array of lasers located in the TOSA housing and configured to generate laser light, wherein each of the lasers are associated with different respective optical channels, and an arrayed waveguide grating (AWG) located in the TOSA housing, optically coupled to the array of lasers, and configured to combine the laser light at different respective channel wavelengths. The TOSA also includes a temperature control device located in the TOSA housing and a plurality of laser thermal shields for thermally shielding the array of lasers. The laser thermal shields are thermally coupled to the temperature control device and define a plurality of thermally shielded compartments. Each of the thermally shielded compartments receives and thermally shields a respective one of the lasers while allowing emitted laser light to pass out of the shielded compartments.

Consistent with a further embodiment, an optical line terminal includes at least first and second multi-channel transceivers. Each of the multi-channel transceivers includes a transceiver housing and a thermally shielded multi-channel transmitter optical subassembly (TOSA) located in the transceiver housing and configured to transmit a wavelength division multiplexed (WDM) optical signal on multiple channel wavelengths. The TOSA includes an array of lasers configured to generate laser light, wherein each of the lasers are associated with different respective optical channels. The TOSA further includes a temperature control device and a plurality of laser thermal shields for thermally shielding the array of lasers. The laser thermal shields are thermally coupled to the temperature control device and define a plurality of thermally shielded compartments. Each of the thermally shielded compartments receives and thermally shields a respective one of the lasers while allowing emitted laser light to pass out of the shielded compartments. Each of the multi-channel transceivers also includes a multi-channel receiver optical subassembly (ROSA) located in the transceiver housing and configured to receive a wavelength division multiplexed (WDM) optical signal on multiple channel wavelengths.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:
1. A multi-channel transceiver module comprising:
a transceiver housing;
a thermally shielded multi-channel transmitter optical subassembly (TOSA) located in the transceiver housing, the TOSA being configured to transmit a wavelength division multiplexed (WDM) optical signal on multiple channel wavelengths, the TOSA comprising:
an array of lasers configured to generate laser light, wherein each of the lasers is associated with different respective optical channels;
a temperature control device; and
a plurality of laser thermal shields for thermally shielding the array of lasers, the laser thermal shields being thermally coupled to the temperature control device and defining a plurality of thermally shielded compartments, wherein each of the thermally shielded compartments receives and thermally shields a respective one of the lasers while allowing emitted laser light to pass out of the shielded compartments, wherein each of the laser thermal shields includes a plurality of walls defining the thermally shielded compartments, respectively, and thermally shielding the laser from heat within the TOSA; and
a multi-channel receiver optical subassembly (ROSA) located in the transceiver housing, the ROSA being configured to receive a wavelength division multiplexed (WDM) optical signal on multiple channel wavelengths.
2. The multi-channel transceiver module of claim 1 further comprising at least one thermal isolation member thermally coupled to the temperature control device, wherein the at least one thermal isolation member is wire bonded to the lasers, respectively, and electrically connected to circuitry outside of the TOSA such that the at least one thermal isolation member electrically connects the lasers to the circuitry outside of the TOSA while preventing external heat from being conducted to the lasers from outside the TOSA.
3. The multi-channel transceiver module of claim 1 wherein the temperature control device is a thermoelectric cooler.
4. The multi-channel transceiver module of claim 1 further comprising an arrayed waveguide grating (AWG) coupled to each of the lasers and configured to combine the laser light at different respective channel wavelengths.
5. The multi-channel transceiver module of claim 4 further comprising an AWG tray supporting the AWG above the array of lasers, the AWG tray being thermally coupled to the temperature control device.
6. The multi-channel transceiver module of claim 1 wherein the laser thermal shields are made of a material having a thermal conductivity greater than 80 W/(m·K).
7. The multi-channel transceiver module of claim 1 wherein the laser thermal shields are integrated as one piece with multiple walls defining the thermally shielded compartments.
8. The multi-channel transceiver module of claim 1 wherein each of the laser thermal shields include a base and wherein the walls extend from the base to define each of the thermally shielded compartments.
9. The multi-channel transceiver module of claim 1 further comprising laser temperature control devices located in each of the thermally shielded compartments for controlling a temperature of each of the lasers individually and independently.
10. The multi-channel transceiver module of claim 1 wherein the laser temperature control device includes a resistive heater.
11. A thermally shielded multi-channel transmitter optical subassembly (TOSA) comprising:
a TOSA housing;
an array of lasers located in the TOSA housing and configured to generate laser light, wherein each of the lasers are associated with different respective optical channels;
an arrayed waveguide grating (AWG) located in the TOSA housing and optically coupled to the array of lasers, the AWG being configured to combine the laser light at different respective channel wavelengths;
a temperature control device located in the TOSA housing; and
a plurality of laser thermal shields for thermally shielding the array of lasers, the laser thermal shields being thermally coupled to the temperature control device and defining a plurality of thermally shielded compartments, wherein each of the thermally shielded compartments receives and thermally shields a respective one of the lasers while allowing emitted laser light to pass out of the shielded compartments, wherein each of the laser thermal shields includes a plurality of walls defining the thermally shielded compartments, respectively, and thermally shielding the laser from heat within the TOSA housing.
12. The thermally shielded multi-channel TOSA of claim 11 further comprising at least one thermal isolation member thermally coupled to the temperature control device, wherein the at least one thermal isolation member is wire bonded to the lasers and electrically connected to circuitry outside of the TOSA housing such that the at least one thermal isolation member electrically connects the lasers to the circuitry while preventing external heat from being conducted to the lasers from outside the TOSA.
13. The thermally shielded multi-channel TOSA of claim 11, wherein the temperature control device is a thermoelectric cooler.
14. The thermally shielded multi-channel TOSA of claim 11 wherein each of the laser thermal shields include a base and wherein the walls extend from the base to define each of the thermally shielded compartments.
15. The thermally shielded multi-channel TOSA of claim 11 further comprising laser temperature control devices located in each of the thermally shielded compartments for controlling a temperature of each of the lasers individually and independently.

16. The thermally isolated multi-channel TOSA of claim 11 wherein the laser thermal shields are made of a material having a thermal conductivity greater than 80 W/(m·K).

17. The thermally isolated multi-channel TOSA of claim 11 wherein the lasers are distributed feedback (DFB) lasers.

18. An optical line terminal comprising:
at least first and second multi-channel transceivers, each of the multi-channel transceivers comprising:
a transceiver housing;
a thermally shielded multi-channel transmitter optical subassembly (TOSA) located in the transceiver housing, the TOSA being configured to transmit a wavelength division multiplexed (WDM) optical signal on multiple channel wavelengths, the TOSA comprising:
an array of lasers configured to generate laser light, wherein each of the lasers are associated with different respective optical channels;
a temperature control device; and
a plurality of laser thermal shields for thermally shielding the array of lasers, the laser thermal shields being thermally coupled to the temperature control device and defining a plurality of thermally shielded compartments, wherein each of the thermally shielded compartments receives and thermally shields a respective one of the lasers while allowing emitted laser light to pass out of the shielded compartments, wherein each of the laser thermal shields includes a plurality of walls defining the thermally shielded compartments, respectively, and thermally shielding the laser from heat within the TOSA; and
a multi-channel receiver optical subassembly (ROSA) located in the transceiver housing, the ROSA being configured to receive a wavelength division multiplexed (WDM) optical signal on multiple channel wavelengths.

19. The optical line terminal of claim 18 wherein the temperature control device is a thermoelectric cooler.

20. The optical line terminal of claim 18 wherein each of the laser array thermal shields include a base plate and wherein the walls extend from the base plate to define each of the thermally shielded compartments.

* * * * *